Aug. 14, 1945.    D. G. C. HARE    2,381,904
METHOD AND APPARATUS FOR LOGGING WELLS
Filed Oct. 16, 1941    2 Sheets-Sheet 2

D.G.C. HARE
INVENTOR
BY
HIS ATTORNEY

Patented Aug. 14, 1945

2,381,904

UNITED STATES PATENT OFFICE 2,381,904

METHOD AND APPARATUS FOR LOGGING WELLS

Donald G. C. Hare, Houston, Tex., assignor, by mesne assignments, to The Texas Company, New York, N. Y., a corporation of Delaware Application October 16, 1941, Serial No. 415,196

3 Claims. (Cl. 250—83.6)

This invention relates to the logging of wells or bore holes and more particularly to a method and an apparatus for determining the radioactivity of the formations traversed by a bore hole. The principal object of the invention is to provide a method and an apparatus by means of which instruments suspended within a bore hole on a two-wire cable can be supplied with electric current from the surface while signals from these instruments can be transmitted simultaneously over the same cable to recording apparatus at the surface.

In accordance with one method of logging earth formations a detector of radiation is lowered into and through a bore hole and the pulses or signals from the detector are suitably amplified and transmitted to a receiving device at the surface. Since the response of the detector will vary in accordance with the radioactivity of the different formations, an indication may be had as to the nature and location of these formations. In most logging systems of this type it is necessary to use a cable either consisting of or including several electric wires or circuits so that the vacuum tubes and other apparatus in the hole can be supplied with electrical current from the surface over one or more circuits while the signals from the instruments in the hole are being transmitted to the surface over a separate circuit or circuits. Multi-wire cables of this type are not only expensive but are cumbersome to handle because of their larger size. As stated above, it is an object of this invention to provide a method and an apparatus by means of which signals can be transmitted in one direction while current is supplied in the other direction over a simple two-wire cable.

In carrying out the invention a device containing a radiation detector and an associated vacuum tube circuit or circuits is adapted to be lowered into the hole on a two-wire cable. The output of the detector is amplified and the average intensity of this amplified output modulates a high frequency carrier generated by an oscillator. This modulated carrier is coupled to the cable and at the surface a band pass filter also coupled to the cable separates the modulated signals which are then passed to a suitable indicating or recording instrument. At the same time a source of low frequency current is coupled to the cable at the surface and the power necessary to energize the vacuum tube and radiation detector circuits is taken from the lower end of the cable by means of another coupling device.

Figure 1:
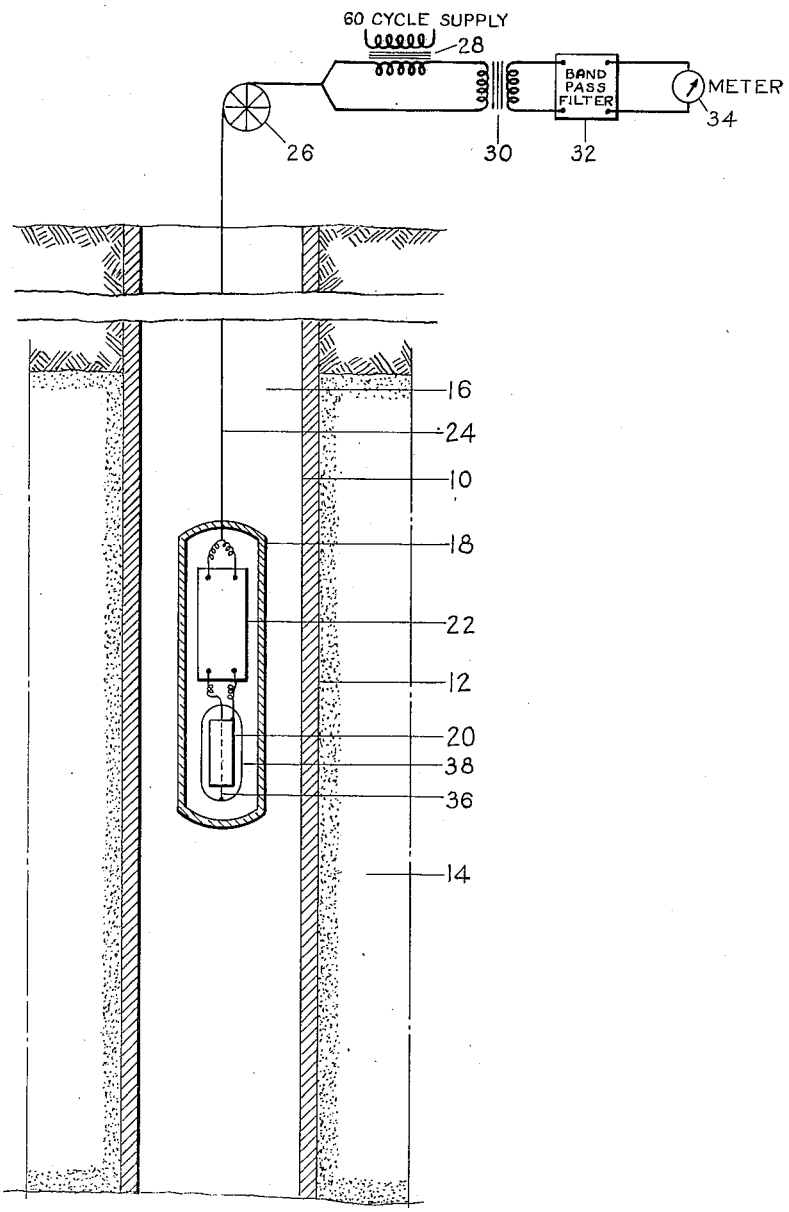
Figure 2:
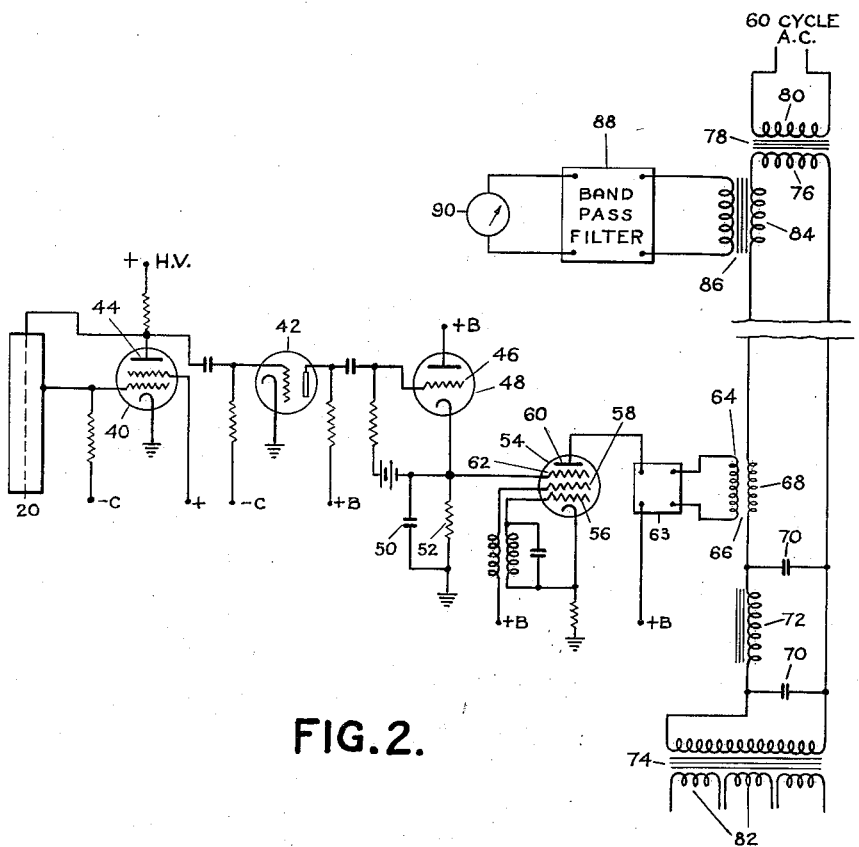
Figure 3:
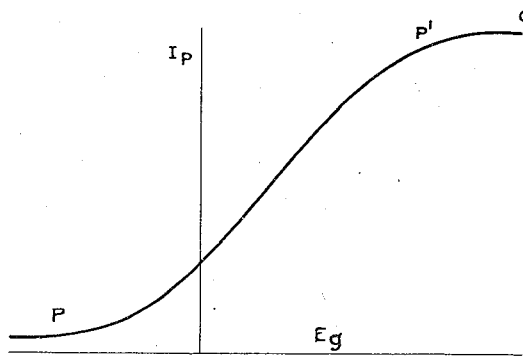

For a better understanding of the invention reference may be had to the accompanying drawings in which Fig. 1 is a vertical elevation through a well or bore hole illustrating diagrammatically the apparatus in the hole and at the surface;

Fig. 2 is an electrical diagram showing the connections and arrangement of the apparatus, while Fig. 3 is a characteristic curve of one of the vacuum tubes.

Referring to the drawings, a bore hole 10 is shown as having been drilled through formations such as are indicated at 12 and 14. A device indicated generally at 16 as comprising a housing 18 within which is mounted a radiation detector or counter 20 and a unit 22 containing the vacuum tube circuits and apparatus to be described, is suspended from a two-wire cable 24. The cable 24 passes over a suitable measuring device 26 which serves to indicate the depth of the instrument in the hole and the upper end of the cable circuit includes windings of transformers 28 and 30, the function of which will also be described. The output of the transformer 30 is shown as passing to a suitable band pass filter 32, the output of which may be connected to a meter 34 or any desired type of recording instrument. The detector 20 is shown as of the conventional Geiger-Muller counter type having a cylindrical cathode and a centrally disposed wire 36 forming the anode. A suitable envelope 38 encloses the cathode and the anode and this envelope is filled with a suitable gas such as argon under a predetermined pressure. Radiation such as a gamma ray entering the housing 38 will strike the cathode to eject an electron which will cause ionization of the gas with a consequent discharge of the counter.

Referring to Fig. 2, the radiation detector or counter is indicated again at 20 and the output of this device is shown as passing to a vacuum tube 40, preferably of the pentode type, utilizing a circuit generally known as a Neher quench circuit whose function it is to stop the discharge of the counter and to amplify the pulses therefrom. At 42 is shown a vacuum tube working on the linear portion (Class A) of its curve whose function is to further amplify these pulses and to convert them from the negative pulses appearing on the plate 44 of the tube 40 to positive pulses on the grid 46 of a vacuum tube 48, which latter tube is arranged to operate at cutoff (Class C). In other words, the grid bias of the tube 48 is sufficiently negative to allow no plate current to flow in the absence of a positive signal.

In Fig. 3 the point P indicates a suitable operating point. The output of the tube 42 is positive and can be made as large as 50 to 100 volts and higher, and with such a large signal the potential of the grid 46 of tube 48 swings completely across the characteristic curve from point P to, say, point Q. From the shape of this characteristic curve it is obvious that any signal larger than the difference between P and P' would cause no further increase in the output of tube 48 since at point P' the tube has reached the condition of saturation. Thus one function of tube 48 is to equalize the pulses arriving at its grid 46 as long as the small pulses are at least large enough to carry the grid to point P'. Since this tube is operated as a Class C amplifier, its output will consist of a series of interrupted uni-directional pulses. A condenser 50 and a resistance 52 are placed in the circuit of the tube 48 and have characteristics such that the potential across the resistance 52 will consist of a steady D. C. voltage with a superimposed statistical fluctuation, the magnitude of which depends upon the ratio of the product of the capacity of the condenser 50 and the resistance 52 to the number of pulses per second being counted by the detector 20. The magnitude of the average potential drop across resistance 52 can be made to be a linear function of the number of pulses per second from the detector 20.

At 54 is shown a vacuum tube of the kind normally termed a converter tube. In this tube the grids 56 and 58 are respectively the control grid and anode of an oscillator whose frequency is determined by the associated inductance and capacity shown. The amount of alternating current generated by this oscillator which will flow to the plate 60 is directly determined by the potential of grid 62, which is shown connected to the cathode load resistor 52. Since the potential drop across the resistance 52 is determined as aforesaid, by the number of pulses arriving per second, the amount of plate current of the tube 54 is also a function of the number of counts registered by the detector 20. This plate current passes through a 60 cycle stop band filter 63 connected to the primary winding 64 of transformer 66, the secondary winding 68 of which is connected in the cable 24 leading to the surface. Condensers 70 and the inductor 72 prevent the alternating current generated by the tube 54 from flowing through the power transformer 74, and the lower portion of the cable circuit is thus effectively short circuited for this frequency which can be made high compared to the power frequency, and yet the secondary of the transformer 66 can be made such as to offer little impedance to the flow of the current of normal power frequency such as 60 cycles per second.

At the surface the secondary 76 of a transformer 78 is connected in the cable circuit, the primary 80 being connected to a suitable source of alternating current supply of, say, 60 cycles per second. Current for supplying the various voltages needed and for heating the filaments of the various tubes is thus transmitted from the source through the transformer 78 to the cable circuit 24 and through the transformer 74 to the filament or other circuits. In Fig. 2 the connections between the separate secondaries 82 of the transformer 74 and the several filaments have been omitted for purposes of simplification.

Also included in the upper portion of the cable circuit 24 is the primary 84 of a transformer 86, the secondary of which is connected to the band pass filter 88. The output of the filter 88 is passed to a suitable meter 90 which can be replaced, if desired, by any suitable recording instrument.

It is believed that the operation will be clear from the foregoing description. Briefly, the output of the detector 20 is amplified by tubes 40 and 42 and then converted to a series of interrupted uni-directional pulses by means of the tube 48. The amount of plate current from the tube 54 is a function of the number of counts registered by the detector 20, and this high frequency current is coupled to the cable circuit 24 by means of transformer 66 and then to the filter 88 by means of transformer 86. At the same time 60 cycle alternating current is coupled at the surface to the cable circuit 24 by means of transformer 78 and then to the power circuits of the vacuum tubes 40, 42, 48 and 54 by means of transformer 74. The high potential necessary for the operation of the Geiger-Muller counter 20 may also be supplied from one of the secondaries 82 of the transformer 74.

Although a conventional Geiger-Muller counter has been illustrated as the detecting device, it may be preferred to use a detector having a higher efficiency such as is disclosed, for instance, in my co-pending patent application, Serial Number 364,020, filed November 2, 1940.

Obviously many modifications and variations of the invention, as hereinbefore set forth, may be made without departing from the spirit and scope thereof, and, therefore, only such limitations should be imposed as are indicated in the appended claims.

I claim:

1. In an apparatus for measuring variations in radioactivity of the formations traversed by a bore hole, a housing, a radiation detector in said housing, a wire cable for lowering said housing through the hole and supplying power to said detector and circuit elements in said housing, a vacuum tube circuit in said housing for amplifying the output of said detector, a second vacuum tube circuit for converting negative potentials from said first circuit to positive potentials, a third vacuum tube connected to said second circuit for equalizing the pulses from said second circuit and converting them to a series of interrupted unidirectional pulses, an oscillating tube circuit for generating a high frequency carrier current, connections between said third tube and said oscillating tube circuit whereby said carrier is modulated by the output of said third tube, means in said housing for coupling said modulated carrier to said cable, means for separating said carrier at the surface from power supply voltage and means for indicating level of said carrier.

2. In an apparatus for measuring variations in radioactivity of the formations traversed by a borehole, a housing, a pulse-yielding radiation detector in said housing, a wire cable for lowering said housing through the hole and supplying power to said detector and circuit elements in said housing, amplifying circuits in said housing for amplifying the output of said detector, a vacuum tube connected to the output of said amplifying circuits for equalizing the pulses therefrom and converting them into a series of interrupted unidirectional pulses, an integration circuit receiving the output of said vacuum tube for converting said unidirectional pulses to a D. C. voltage the magnitude of which varies with the rate of said pulses, an oscillating tube circuit for generating a high frequency carrier current, said oscillating tube circuit being connected to said integration circuit whereby said carrier current is modulated in accordance with variations in said D. C. voltage, means in said housing for coupling said modulated carrier to said cable, means for separating said carrier at the surface from power supply voltage and means for indicating the level of said carrier.

3. In an apparatus for measuring variations in radioactivity of the formations traversed by a bore hole, a housing, a radiation detector in said housing, a wire cable for lowering said housing through the hole and supplying power to said detector and circuit elements in said housing, a vacuum tube circuit in said housing for amplifying the output of said detector, a second vacuum tube circuit for converting negative potentials from said first circuit to positive potentials, a third vacuum tube connected to said second circuit for equalizing the pulses from said second circuit and converting them to a series of interrupted unidirectional pulses, an integration circuit receiving the output of said third vacuum tube for converting said unidirectional pulses to a D. C. voltage the magnitude of which varies with the rate of said pulses, an oscillating tube circuit for generating a high frequency carrier current, connections between said third tube and said oscillating tube circuit whereby said carrier is modulated by the output of said third tube, means in said housing for coupling said modulated carrier to said cable, means for separating said carrier at the surface from power supply voltage and means for indicating level of said carrier.

DONALD G. C. HARE.